United States Patent [19]

Aspén

[11] 4,223,792
[45] Sep. 23, 1980

[54] RACK FOR STORING GOODS OF CONSIDERABLE LENGTH

[75] Inventor: Kjell G. Aspén, Halmstad, Sweden

[73] Assignee: Acierex AB, Stockholm, Sweden

[21] Appl. No.: 931,592

[22] Filed: Aug. 7, 1978

[30] Foreign Application Priority Data

Aug. 24, 1977 [SE] Sweden .............................. 7709506

[51] Int. Cl.² .............................................. A47F 5/00
[52] U.S. Cl. ................................. 211/162; 211/60 R
[58] Field of Search .............. 211/46, 60 R, 151, 162; 214/1 P, 16.4 R, 16.4 A

[56] References Cited

U.S. PATENT DOCUMENTS

| 2,549,239 | 4/1951 | Robertson et al. ......... 214/16.4 A X |
| 2,769,559 | 11/1956 | Johnson ........................... 211/151 X |
| 3,138,266 | 6/1964 | Fahey et al. .................... 214/16.4 A |
| 3,157,424 | 11/1964 | Hall ................................ 211/60 R X |
| 3,214,227 | 10/1965 | Filipowicz ....................... 211/162 X |
| 3,239,076 | 3/1966 | Huff et al. ................... 214/16.4 R X |
| 3,239,077 | 3/1966 | Huff et al. ............................ 214/1 P |
| 3,567,039 | 3/1971 | Evans .................................. 211/162 |
| 3,662,860 | 5/1972 | Burch .......................... 214/16.4 A X |
| 3,669,372 | 6/1972 | DeJong ............................. 211/122 X |

FOREIGN PATENT DOCUMENTS

| 981436 | 1/1976 | Canada ................................... 214/1 P |
| 1289896 | 2/1962 | France ................................ 211/60 R |
| 6613304 | 3/1967 | Netherlands ............................. 211/151 |

*Primary Examiner*—Thomas J. Holko
*Attorney, Agent, or Firm*—Neil F. Markva

[57] ABSTRACT

Rack for storing goods of considerable length, such as battens and bars, including compartments in each of which a carriage is adapted to run on longitudinal rails. The carriage is short and vertical, has the same cross-section as the compartment and has wheels located at its upper position. The carriage supports the inner end of the goods, while the outer end of the goods in the storage position rests in the compartment. A lifting device is structured for supporting the outer end of the goods when inserting and pulling out the goods.

8 Claims, 7 Drawing Figures

RACK FOR STORING GOODS OF CONSIDERABLE LENGTH

BACKGROUND OF THE INVENTION

The present invention relates to racks for storing goods of considerable length, such as battens, bars, tubing, sections, rolled carpets, rollers and the like.

Normally, goods of this kind are stored in racking consisting of compartments arranged in a framework rack, each compartment having specific height, length and width dimensions. The goods are placed directly on the bottom of the compartment. The compartments are elongated and open onto a central passage. Standing in the passage, a person can select and withdraw a specific dimension from a compartment.

When a bar is to be withdrawn from the rack, it is pulled along the bottom of the compartment while overcoming the frictional forces at the bottom. Very often the goods are assembled into bundles. In that case, the whole bundle must be taken out from the compartment, whereupon the desired number of bars or the like may be picked out and the bundle restored to the compartment. However, such a bundle will very often be heavy and unwieldy.

To facilitate the handling of such goods, the central passage is provided with a lifting device, such as a travelling crane and/or a movable support which can be raised and lowered. Generally, the goods must be manually pulled out laterally from their compartments because the operation is difficult to perform mechanically. A travelling crane or the like can only lift the outer end of the goods because it is not possible to reach the inner end of the goods. Consequently, the inner end of the goods drag along the bottom of the compartment while being pulled out. Since the bundles may be heavy, the frictional force to be overcome may be quite large. Obviously, this manual handling of heavy materials is hazardous and laborious work.

If the compartment in the frame work racking only has transverse beams without a complete floor, the insertion of the goods is also difficult. Thus, it is necessary to take care that the goods will remain in the correct compartment and will not enter the adjacent compartment.

It is known to use carriages in racking for moving goods stored in the rack. In such a previously known design, the goods are stored on loading pallets which are placed on a wheeled carriage. The carriage together with the loading pallet and the goods loaded thereon are inserted into an insertion station at one end of the rack and is taken out after storage at a taking-out station at the other end of the rack. The carriage with the loading pallet is moved successively between the insertion and the taking-out stations in rails provided in the bottom of the compartment. A carriage of this kind is horizontal and adapted to carry the entire goods. However, until now, carriages for storing goods of considerable length have not been used.

SUMMARY OF THE INVENTION

The object of the present invention is to provide a storage system which permits a simple insertion and withdrawal of the material into and from the various compartments in a rack thereby avoiding hazardous and laborious work when handling the goods.

The present invention comprises a rack consisting of a plurality of compartments arranged beside and/or above one another in a framework structure. Each compartment has longitudinal rails in which a wheeled carriage is adapted to run. The carriage is short and vertical and has essentially the same cross-sectional dimensions as the cross-section of the compartment. The carriage is adapted to carry the inner end of the goods, while the outer end of the goods and possibly the intermediate portions of the goods will rest directly on the framework in the storage position. When inserted or taken out, the goods will rest in a lifting device or, when the goods are in their outermost position, they will rest in a movable support which is adjustable vertically.

The carriage wheels are preferably located in the upper portion of the carriage and the carriage consists of a steel strip bent to U-shape. If desirable, the carriage also has guides which will keep the carriage at right angles to the longitudinal axis of the compartment. Each of the longitudinal rails may be used for two adjacent compartments. If it is to carry tubular or angular goods, the carriage should have a central bar inserted through the goods. Goods having a tendency to sag should rest in the storage position with about $\frac{1}{4}$ of its length behind the carriage and about $\frac{1}{4}$ of its length in front of the front portion of the framework. The overhang thereby compensates for possible tendencies in the goods to sag.

When the rack is used, the goods are lifted by means of a suitable lifting device, such as a travelling crane, a truck or the like. The inner end of the material is placed in the carriage which is located at the front end of the framework and the outer end of the goods is placed in an independent support arranged in front of the compartment. Lifting means lift the outer end of the goods and the material is moved simply and without difficulty in a wheelbarrow-like movement into the compartment, the material itself forming the body of the wheelbarrow. Upon insertion, the carriage suspended by means of wheels will run along the rails located in the compartments so that it will be located in the interior of the compartment when in storage position. During storage, the inner end of the goods is carried by the carriage while the outer end of the goods rests directly on the framework. Withdrawing goods takes place in the corresponding manner although of course with the various measures taken in reverse order.

BRIEF DESCRIPTION OF DRAWINGS

Other objects of the this invention will appear in the following description and appended claims, reference being made to the accompanying drawings forming a part of the specification wherein like reference characters designate corresponding parts in the several views.

DETAILED DESCRIPTION

Figure 1:
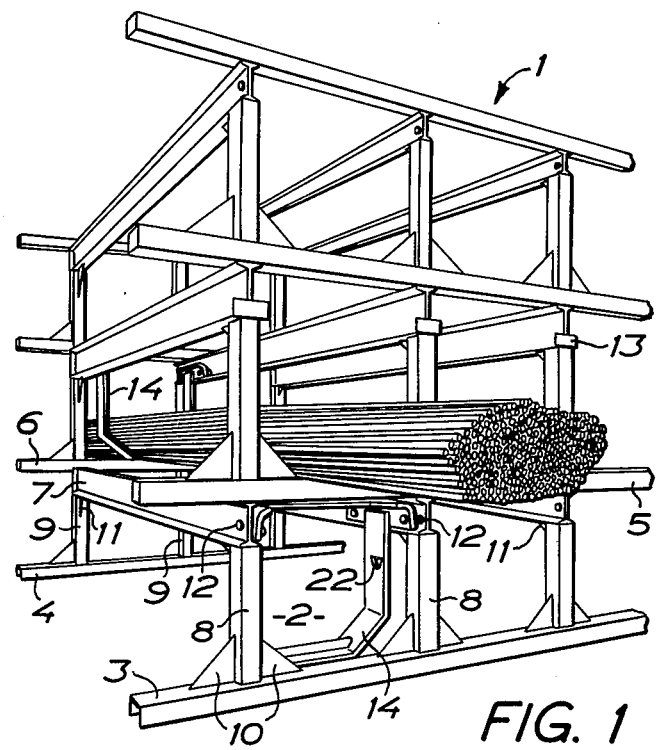
FIG. 1 is a perspective view of a portion of a rack according to the present invention with a bundle of bar steel placed in a compartment.
Figure 2:
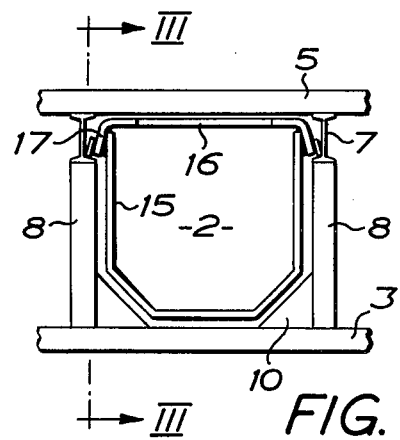
FIG. 2 is an elevation view of a compartment according to FIG. 1 with the pertaining carriage.
Figure 3:
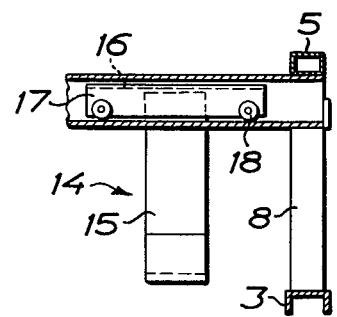
FIG. 3 is a view taken on line III—III in FIG. 2.

As shown in FIGS. 1 to 3, each compartment 2 consists of a horizontal longitudinal lower and forward beam 3 and a rear beam 4, a horizontal longitudinal upper and forward beam 5 and a rear beam 6. Beams 3, 4, 5, and 6 are fixed and stationary within the framework structure. Two transverse I-sections 7 are provided immediately below upper beams 5 and 6. I-sections 7 extend along the length of the upper section of each compartment and rest in turn on two front and two rear vertical supports or beams 8 and 9, respectively. The support 8 is reinforced with triangular plates 10 in relation to lower beam 3, and with triangular plates 11 in relation to overhead I-beam 7. The lower beams 3 and 4 have U-shaped cross-section which is dimensioned so as to grip around the upper beams 5 and 6 in the compartment lying below. At their ends the I-beams include stopping members comprising bolts 12 or plates 13 welded onto the beams.

Each compartment holds a carriage 14 including a steel strip 15 having a width of about 10 cm and bent to U-shape. The open end of the U opens upwardly and is bridged by a sheet metal strip 16 including widened margins each having a considerably larger width and ending in pendent flanges 17. The U-shaped steel strip 15 is welded to the central point of the pendent flanges 17. At their respective corners, flanges 17 carry four wheels 18 journalled by means of ball bearings. Wheels 18 occupy a small angle outwardly in relation to a vertical line.

The carriage 14 has height and width dimensions that are slightly smaller than the cross-section of the compartment and is mounted to move in a direction parallel to longitudinal rails 7, as shown. The wheels 18 constitute rolling members located at such a distance and in such a way that they will cooperate with the lower and inner surfaces of the I-sections 7 which thereby form rails for carriage 14. Due to the distance between two wheels 18 located at the same side of carriage 14, the outer surfaces of wheels 18 form guides cooperating with the vertical web of I-sections 7 so that carriage 14 is prevented from slanting. The stopping members 12 or 13 will prevent carriage 14 from being taken out from its rails involuntarily after being installed. As shown by the drawings, each I-section 7 is utilized so as to form rails in two adjacent compartments.

The storage system according to FIGS. 1 to 3 functions as follows. The rack system is meant to hold and store goods of considerable length, e.g. steel bars. Each compartment preferably holds a specific dimension. When a bundle of steel bars is to be loaded into the rack, the bundle is first lifted by means of a lifting device located in front of the rack, e.g. a travelling crane, a fork-lift truck or the like. One end of the bundle is placed in carriage 14 which is in a forward position located at the forward end of the compartment next to the central passage. The outer end of the bundle is placed on a movable support which may be adjusted vertically, e.g. the one shown in FIG. 7. Thereupon the lifting point of the lifting device is moved to the other end of the bundle and the bundle is lifted there an inch or so from the support. The whole bundle is then inserted into the rack in a wheelbarrow-like movement, the bundle of goods constituting the body of the wheelbarrow and carriage 14 constituting the wheel of the wheelbarrow. Finally, the other, outer end of the bundle of goods is lowered so as to rest against the lower forward beam 3 of the compartment, while the inner end of the bundle still rests in carriage 14 which is now at a rearward storage position.

Withdrawing goods from the compartment takes place in the corresponding manner, with the operation carried out in the reverse order. Withdrawing or inserting parts of bundles may take place in a corresponding manner so that the entire bundle of goods is withdrawn from the compartment, whereupon the desired number of goods are taken out or added and the remaining bundle of goods are restored to the compartment. Individual bars may be taken out or inserted manually in a manner known per se without the bundle of goods having to be taken out.

By means of the device according to the invention it is possible to avoid manual lifting and handling of the material. Preferably, the goods rest in the storage position with about $\frac{1}{4}$ of its length behind the carriage and about $\frac{1}{4}$ of its length in front of the forward beam, respectively, in order to compensate for possible tendencies in the goods to sag.

Figure 5:
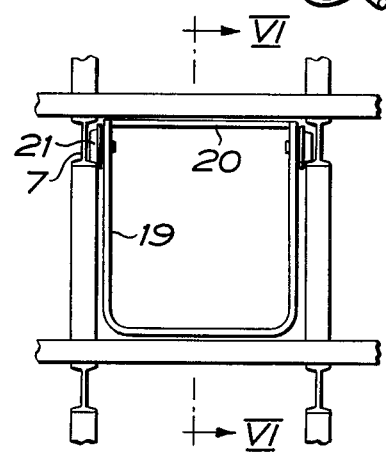
FIG. 5 is an elevation view of a modified carriage according to the present invention.
Figure 6:
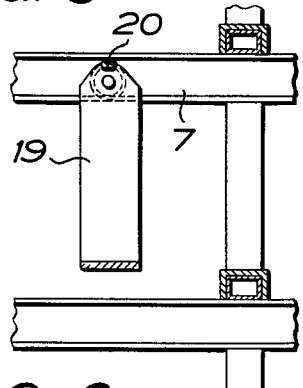
FIG. 6 is a cross-sectional view on line VI—VI in FIG. 5.

FIGS. 5 and 6 show a modified carriage according to the present invention. The carriage includes a steel strip 19 bent to U-shape, the upper open end of which is bridged by a narrower steel strip 20. Two wheels 21 are mounted in the upper portions of the U-legs. Wheels 21 have such a shape that they will fit in the recess of I-sections 7. The diameter of wheels 21 is as large as possible so that the best possible guiding is achieved. The carriage according to FIGS. 5 and 6 is suitable for smaller installations where the risk of clamping fast and inclining the carriage is small. Possibly, the carriage may include guides keeping it at right angles to the longitudinal axis of the compartment.

In different embodiments of the invention it is of course possible to impart to the carriage any shape which is suitable for the purpose intended, e.g. V-shape or parallel trapezoidal shape.

Goods having a very considerable length tend to sag when handled. In such an instance, the material may first be placed in a rigid cradle to prevent sagging and then handled in accordance with the operation described above.

In the embodiments shown, the point of gravity of the carriage and the goods are located below the point of suspension, which provides for good stability. However, points of suspension and rails located in other places are possible, such as a single rail at the middle of the compartment roof, or rails in the lower portions of the sides of the compartment. Also a carriage without wheels which do not run in rails but run directly on the floor of the compartment is possible. Furthermore, a carriage having an air cushion device may be used according to the present invention.

The carriage wheels are preferably journalled with ball bearings and may be provided with a self-lubricating outer coating. This provides for a reliable and easy function.

Figure 4:
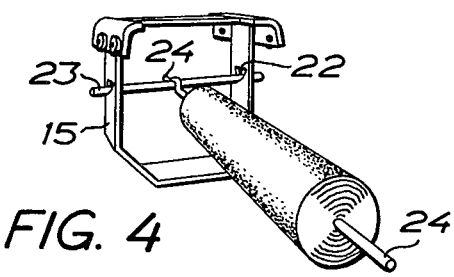
FIG. 4 is a perspective view of a carriage adapted to carry a rolled material by means of a central bar.

The rack may also be used for storing wall-to-wall carpeting, paper rolls or any other material wound into roll shape or wound helically. As shown by FIG. 4, the carriage includes recesses 22 approximately at the middle of the respective leg of the U-shaped steel strip 15. One shaft or cross member 23 is adapted to extend between and through the two recesses 22. The middle of shaft 23 forms a point of support for a central bar 24 extending longitudinally through the roll of material and carried by the lifting device at the other end as described above.

Figure 7:
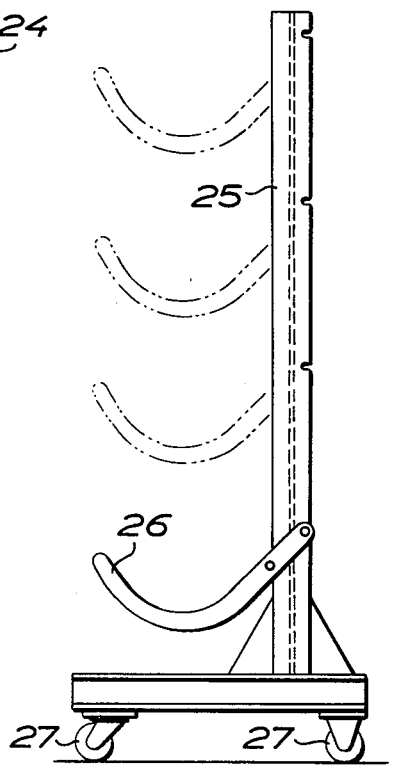
FIG. 7 is an elevation view of a movable support used in accordance with the present invention.

FIG. 7 shows a movable support for use in connection with the present invention. The support comprises an upright 25 having a loading yoke 26 which is vertically adjustable as well as three wheels 27. The use of the support has been described above.

Even if preferred embodiments of the invention have been described above with reference to the drawings, the invention is not limited to these embodiments but is only limited by the following claims.

What is claimed is:

1. A rack for storing goods of considerable length such as battens, bars, tubing, rolled carpets, rollers and the like, said rack comprising:
   (a) a plurality of compartments arranged beside and/or above one another in a framework structure,
   (b) each compartment including longitudinal rails extending along the length of an upper section of each compartment,
   (c) carriage means mounted in each compartment to move in a direction parallel to the longitudinal rails,
   (d) said carriage means having a generally U-shape upwardly directed and essentially the same cross-sectional dimensions as the cross-section of the respective compartment,
   (e) the carriage means including roller members located at the upper portions of the U-shape and being in rolling contact with the longitudinal rails,
   (f) the carriage means being movable between a forward position and a rearward storage position to carry the inner end of the goods while a portion of the goods at a location intermediate the ends thereof rests in a storage position directly on the framework structure at the forward end of the compartment when the carriage means is in a rearward storage position.

2. A rack as claimed in claim 1 wherein the carriage means includes a steel strip bent to U-shape.

3. A rack as claimed in claim 1 wherein the carriage means has guides keeping the carriage means at right angles to the longitudinal axis of the compartment.

4. A rack as claimed in claim 1 wherein when the carriage means is in a storage position the goods rest with approximately ¼ of their length behind the carriage means and about ¼ of their length in front of the forward end of the framework thereby providing an overhang to compensate for sag tendencies in the goods.

5. A rack as claimed in claim 1 wherein the carriage means includes a cross member which carries a central bar inserted through tubular or annular goods and extending lengthwise of a compartment.

6. A rack as claimed in claim 1 wherein each of the longitudinal rails is disposed to movably support one side of a carriage means in two adjacent compartments.

7. A rack as claimed in claim 1 wherein the framework structure at the forward end of each compartment is a stationary fixed member.

8. A rack as claimed in claim 1 wherein the rolling members comprise wheels located on opposite outward sides of the upper portions of said U-shape.

* * * * *